Sept. 25, 1962 W. T. HEDGCOCK 3,056,076

AMPLITUDE MODULATED A.-C. ERROR SIGNAL SERVOSYSTEM WITH ERROR CONVERSION TO PULSES AND RECONVERSION

Filed May 14, 1959 3 Sheets-Sheet 1

INVENTOR.
WENDELL T. HEDGCOCK
BY Marvin Moody
ATTORNEY

Sept. 25, 1962 W. T. HEDGCOCK 3,056,076

AMPLITUDE MODULATED A.-C. ERROR SIGNAL SERVOSYSTEM WITH ERROR CONVERSION TO PULSES AND RECONVERSION

Filed May 14, 1959 3 Sheets-Sheet 2

INVENTOR.
WENDELL T. HEDGCOCK
BY
ATTORNEY

Sept. 25, 1962 W. T. HEDGCOCK 3,056,076

AMPLITUDE MODULATED A.-C. ERROR SIGNAL SERVOSYSTEM WITH ERROR CONVERSION TO PULSES AND RECONVERSION

Filed May 14, 1959 3 Sheets-Sheet 3

INVENTOR.
WENDELL T. HEDGCOCK
BY
ATTORNEY

United States Patent Office 3,056,076
Patented Sept. 25, 1962

3,056,076

AMPLITUDE MODULATED A.C. ERROR SIGNAL SERVOSYSTEM WITH ERROR CONVERSION TO PULSES AND RECONVERSION

Wendell T. Hedgcock, Cedar Rapids, Iowa, assignor to Collins Radio Company, Cedar Rapids, Iowa, a corporation of Iowa Filed May 14, 1959, Ser. No. 813,121
8 Claims. (Cl. 318—29)

This invention relates generally to a means for converting a suppressed carrier A.C. error signal voltage in a servo system into a type of square wave wherein the positive and negative portions of the square wave have a width which is proportional to the magnitude of the error signal and a phase of the fundamental component of the square wave which is determined by the phase relationship between the error signal voltage and a reference voltage.

While a conventional error signal, such as a sine wave, might be coupled to a servo amplifier, having at least one power transistor therein, and the output therefrom used to energize a control winding and thereby actuate a servo motor, this proved to be inefficient due to the amount of power dissipated in the amplifier.

This dissipation of power has been reduced heretofore by utilizing a magnetic amplifier or thyratron circuit as a means for converting a suppressed carrier type error signal in a servo system to a substantially square wave signal of sufficient magnitude to drive a servo motor or other transducer. Such conversion means, however, must also maintain the phase relationship between the suppressed carrier voltage and the amplified voltage such that the servo motor will accurately follow the angular position of the error generator. As a result, these systems suffer from certain defects that result in inadequate or inefficient operation. The magnetic amplifier, for example, is limited not only by a long inherent time constant but also by an additional time constant of a low pass filter that must be applied to the phase detected signal at the input to the magnetic amplifier in order that a direct current signal will be produced. In addition, both the magnetic amplifier and the thyratron circuits suffer from a 90° phase shift between small and large signal conditions.

It is therefore an object of this invention to eliminate the time constant or frequency response limitation of the magnetic amplifier and thyratron circuits.

It is a further object of this invention to eliminate the need for phase detection which is required to produce a direct current drive signal.

A still further object of this invention is to eliminate the 90° phase shift between large and small signal conditions.

It is a further object of this invention to provide a control pulse that starts at zero and grows in width in both directions in proportion to the magnitude of the error signal.

It is a still further object of this invention to provide means including a power amplifier and a device for supplying a low level square wave signal input to said power amplifier so that said means can deliver high power to a control motor with a minimum of power dissipation.

This invention features a wave forming and signal combining network that develops positive and negative square pulses wherein the width of the pulses is determined by the magnitude of the error voltage and the phase of the fundamental component of the resulting square wave, hereafter referred to as the phase of the pulse train, is determined by the phase of the error voltage. The above is accomplished by applying the reference voltage to a primary of a transformer which contains a center tapped secondary. The error signal is applied to the center tap of the secondary with its phase in quadrature with the reference voltage. As the error voltage increases, the resultant voltage developed on each side of the center tapped secondary has a phase shift equal to the arctangent of the ratio of error voltage to reference voltage developed on the respective halves of the secondary. The two resultant voltages, one leading and the other lagging the error voltage, are applied to their respective clipping circuits and subsequently added together by a mixer or adder to form a train of positive and negative pulses whose width depends upon the amplitude and whose phase depends upon the phase of the error signal. Thus, as the error signal increases from zero, the positive and negative pulses resulting from the addition of the voltage appearing at the outputs of the modulator will increase in width. This will cause the fundamental component of the square wave to vary in magnitude in relationship to the magnitude of the error voltage. The subsequently amplified square waveform will be applied to the control phase of a two phase servo motor which will respond to the fundamental component of the square wave. The harmonics of the square wave may either be dissipated as heat in the motor or bypassed to ground by a capacitor.

It is another feature of this invention that the waveform output from the mixer that is applied to the power amplifier operates very uniquely upon the power amplifier if transistors are employed. Since the output is a square wave which has its width proportional to the error signal magnitude, the transistor will be operated in an "on" and "off" state in a switch type operation for a period of time proportional to the magnitude of the error signal. However, during the period of "on" time, the transistor will be in a state of saturation, which means that the transistor will be operating at its lowest internal resistance. This condition will cause the transistor to have an absolute minimum of internal power loss. The converse is true when the transistor is operated with a signal such as a sine wave, since the internal impedance will change gradually from minimum to maximum with each cycle resulting in the internal power loss reaching a magnitude greatly in excess of the "switching" type operation.

Further objects, features, and advantages of the invention will become apparent from the following description and claims when read in view of the accompanying drawings, in which:

Figure 3:
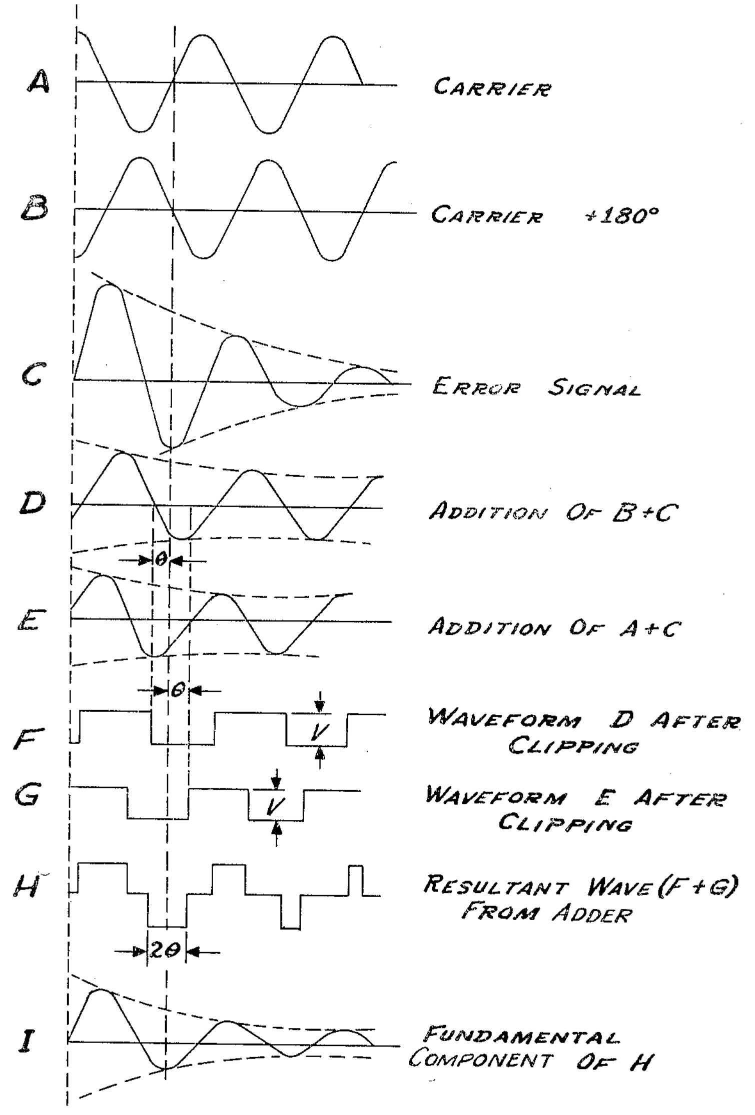
Figure 4:
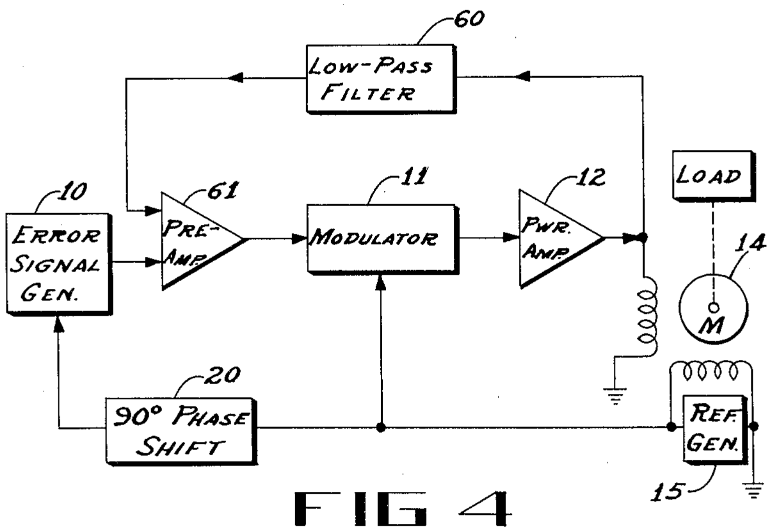

FIGURES 3(*a*)–(*i*) show waveforms used to explain the operation of the wave forming and signal combining network of this invention; and FIGURE 4 shows a means for linearizing the output of this invention.

Figure 1:
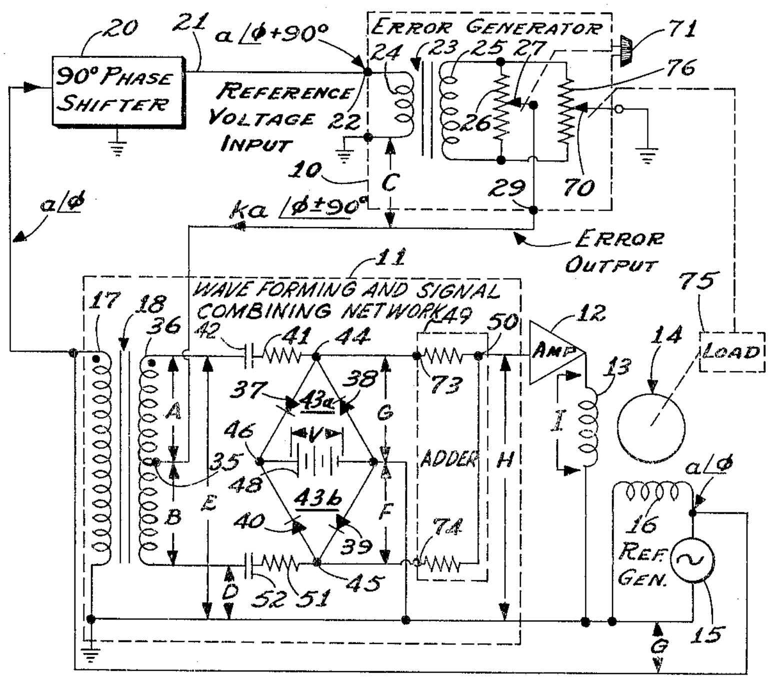
FIGURE 1 is a schematic of one embodiment of the invention.

Referring to FIGURE 1, an error generator 10 is connected to a wave forming and signal combining network 11. The output of the network is connected to a power amplifier 12 which may be of the push pull class B type employing power transistors. The output of the power amplifier is fed to a winding 13 of a motor 14. A reference generator 15 supplies a reference voltage to a winding 16 of motor 14 and to a primary 17 of a transformer 18 of network 11. Voltage from the reference generator is likewise applied to a 90° phase shifter 20 which develops a quadrature voltage with respect to the reference voltage at its output 21 which is applied to the error generator at an input terminal 22.

The error generator 10 may be of any well-known type and may, for example, contain a transformer 23 having a primary 24. The primary is connected between terminal 22 and ground, and induces a quadrature voltage in the secondary 25. A potentiometer 26 is connected across the secondary. An arm 27 is connected to output terminal 29. The position of the arm is determined by a mechanical input 71. The output terminal 29 of the error signal generator is connected to network 11 at a center tap 35 of a secondary 36 of transformer 18. Since the only function of the phase shift network 20 is to change the phase of the output from the error generator by 90°, it is obvious that the phase shift network could be placed on the output of the error generator as well as its input.

Network 11 includes two shunt clipper circuits 43*a* and 43*b*. Each end of the secondary 36 of transformer 18 is coupled through capacitors 42 and 52 to the input resistors 41 and 51 of clipper circuits 43*a* and 43*b* respectively. The other ends of resistors 41 and 51 are connected to the inputs 73 and 74 respectively of adder circuit 49. Voltage limiting diodes 38 and 39 are connected between junctions 44, 45 and ground and are poled to conduct when the voltage at junction 44 or 45 becomes negative. Diodes 37 and 40 are connected from junctions 44 and 45 respectively to the positive pole of a bias battery 48. The negative pole of bias battery 48 is connected to ground. The diodes 37 and 40 are poled to prevent conduction when the positive voltage at junctions 44 and 45 exceed the potential of the battery. While any standard mixer or signal combining means, such as a transformer, may be used, resistor-type mixer or adder 49 is illustrated. An output 50 of the mixer is applied to the input of amplifier 12.

The motor 14 may be connected to a load 75. The servo loop may be completed by connecting the motor or load mechanically to an arm 70 of balancing potentiometer 76.

Figure 2:
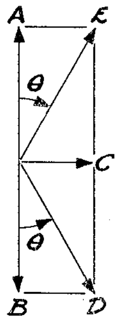
FIGURE 2 is a vector diagram illustrating the addition of voltages within the wave forming and signal combining network.

In operation, an error introduced from mechanical input 71 causes potentiometer arm 27 to move from its previous position causing an error voltage, see FIGURE 3(*c*), to appear at output terminal 29. The magnitude and phase of the error voltage will depend upon the distance the potentiometer was moved and the direction it was moved respectively. Voltages D and E are then applied to the input of the clipper circuits 43*b* and 43*a*, respectively. As signal E attempts to exceed the voltage V of source 48, diode 37 will conduct clipping the remaining positive portion of the cycle. In other words, when the signal E causes the anode of diode 37 to become positive with respect to the positive bias voltage on the cathode due to D.C. power source 48, the diode will conduct through source 48 to ground which is connected to the negative terminal of source 48. Similarly, as E becomes negative, diode 38 will conduct and since the anode of diode 38 is grounded the negative portion of the cycle will be clipped. After a few cycles of operation, capacitor 42 will have an average charge of V/2 and square wave G will have a 50% duty cycle. The operation of the clipper circuit on voltage D is exactly the same as the operation on voltage E. As D becomes negative, diode 39 conducts and since the anode of diode 39 is connected to ground, the negative portion of the signal is clipped. Likewise as the positive portion of voltage F exceeds the voltage V of source 48, diode 40 will conduct, and since the cathode of diode 40 is connected to source 48 (which is grounded at its negative terminal) that part of the positive portion of voltage F exceeding V is clipped. Voltage F (see FIGURE 3(*f*)) therefore also reaches a fifty percent duty cycle. The output voltages F and G from the clippers 43*b* and 43*a* are then applied to the inputs 74 and 73 respectively of mixer or adder 49 where voltages F and G are added resulting in a composite voltage H. From the vector diagram of FIGURE 2 and from waveform H of FIGURE 3, it can be seen that if the carrier is constant in amplitude, the pulse width of the output H varies as a tangent of $$\frac{C}{A}$$

For small values of C, the tangent of $$\frac{C}{A} \text{ equals } \frac{C}{A}$$

Thus, output voltage D will vary linearly with small value of C.

The mixing or combining operation is further explained by referring to FIGURE 3(*d*). The zero voltage point of waveform D is lagging the zero voltage point of A by the angle $\theta$. Likewise, the zero voltage point of E is leading the zero voltage point of B by an angle of $\theta$. Since the outputs F and G have a fifty percent duty cycle, as previously explained, their addition will result in waveform H which then necessarily grows in width by twice the angle $\theta$ or $2\theta$. Thus, as the width increases, the magnitude of the fundamental component of H increases in proportion to $\theta$. The added or combined square waves F and G, which are represented by waveform H, are then applied to amplifier 12. As brought out more fully hereinafter, it is a feature of this invention that the application of a square wave input of low power is used to drive amplifier 12, which, in turn, provides the necessary high power to actuate motor 14. FIGURE 3(*i*) represents the fundamental component that would appear across the control wedge of motor 14 due to the amplification and application of square wave H thereto. Thus, as the error signal C diminishes, the fundamental I will likewise diminish and reach a null at the same instant as the error voltage.

Referring to FIGURE 4, the over-all linearity of the system can be clearly enhanced by providing a feedback path from the motor through a low-pass filter 60 to a preamplifier 61 which in turn feeds network 11. The low-pass filter 60 should permit the fundamental voltage I to pass unattenuated but should remove the remaining harmonics. Thus, as the fundamental diminishes, the feedback will diminish and as the fundamental component increases, the feedback will increase. This action will tend to linearize network 11.

As is well known in the art, utilization of a signal having a sinusoidal waveform to switch a transistor between conductive and nonconductive states dissipates considerably more power than does utilization of a square wave signal for the same purpose since in the latter case the transistor is rapidly driven to saturation while in the former case the saturation point of the transistor is reached relatively slowly and hence the transistor presents comparatively high impedance. Thus the square wave output signal from the wave forming and signal combining network of this invention is particularly well suited for switching a transistor power amplifier between conductive and nonconductive states. This permits low powered transistors to be utilized for operating motors where relatively high powered transistors have been used in the past since the magnitudes of the peaks of the voltage H (FIGURE 3) can be amplified so that they will exceed the saturation point of a transistor. The transistor will react as a switch maintaining the "on" time directly proportional to the magnitude of the error signal as previously mentioned.

Thus, a system is disclosed which produces a control pulse which varies in width in proportion to the error signal voltage magnitude. The signal is extremely well adapted for operating a push pull transistor power amplifier since it develops positive and negative pulses which will drive the transistors to their saturation state for a period proportional to the error signal magnitude. The circuit utilizes the most desirable operating internal resistance of the transistor, hence resulting in a minimum of power loss within the transistor. This system, as a consequence, permits small power transistors to drive high power loads in response to an error signal without exceeding the transistor power rating.

Although this invention has been described with respect to a particular embodiment thereof, it is not to be so limited, as changes and modifications may be made therein which are within the full intended scope of the invention as defined by the appended claims.

I claim:

1. A device for receiving a pair of input signals one of which is an error signal and the other of which is a reference signal, and providing a square wave output signal the time duration of each square wave being dependent upon the magnitude of said input error signal and the phase being dependent upon the phase of said input error signal with respect to said reference signal, said device comprising an input terminal, an output terminal, a transformer which includes a primary and a center tapped secondary, means for applying a reference voltage to said primary, means for connecting the center tap of said secondary to said input terminal, said input terminal adapted to receive an error voltage in quadrature with said reference voltage, adding means having first and second inputs, a first and second clipping means each having an input and an output, and means connecting each side of said secondary to an input of said first and second clipping means respectively, the output of said first and second clipping means to the first and second inputs of said adding means respectively, and the output of said adding means to said output terminal whereby a substantially square wave output signal may be coupled from said device.

2. A device for receiving a pair of input signals one of which is an error signal and the other of which is a reference signal, and providing a square wave output signal, the time duration of each square wave being dependent upon the magnitude of said input error signal and the phase being dependent upon the phase of said input error signal with respect to said reference signal, said device comprising an input terminal and an output terminal, a transformer which includes a primary and a center tapped secondary, means for applying a reference voltage to said primary, means for connecting said center tap to said input terminal, said input terminal adapted to receive an error voltage in quadrature with said reference voltage, adding means including first and second inputs, first and second clipping means having an input and an output, means connecting said secondary to each input of said first and second clipping means, each output of said first and second clipping means connected respectively to said first and second inputs of said adding means, the signal at the inputs of said first and second adding means being constrained to lie between first and second preselected voltages with respect to ground, and output means connecting the output of said adding means to said output terminal for coupling a substantially square wave signal therefrom.

3. A servo system comprising a reference voltage generator, an error generator, a phase shifter, said reference generator supplying a reference signal $a\angle\phi$ to said phase shifter where $a$ is the magnitude and $\phi$ is the phase angle of said reference signal, said phase shifter adapted to produce a voltage of $a\angle\phi+90°$ at the output thereof, the output of said phase shifter connected to an excitation input of said error generator, said error generator additionally containing a mechanical input responsive to external adjustment, said external adjustment causing said error generator to produce an error signal at its output with a relationship of $ka\angle\phi\pm90°$ where $ka$ is the magnitude of said error signal caused by said mechanical adjustment and $\phi\pm90°$ is the phase of said signal dependent upon the direction of said mechanical adjustment, combining means having a first input connected to said reference generator for receiving a reference signal at $\angle\phi$ therefrom and a second input connected to said error generator for receiving the output therefrom, said combining means producing a third and fourth resultant voltage by converting said reference voltage into first and second voltages of $a\angle\phi$ and $a\angle\phi+180°$ respectively and vectorially combining said first and second voltages with said second input voltage $ka\angle\phi\pm90°$ to form third and fourth resultant voltages, adding means adapted to produce a single output signal, servo means connected to the output of said adding means, said servo means including power amplifier means for receiving the output from said adding means and a motor one winding of which is connected to receive the output from said power amplifier means, and means for connecting said adding means to said combining means including means for clipping said third and fourth resultant voltages at a predetermined level whereby a square wave type signal is developed which operates said servo means in which the positive and negative portions of said square wave grows in width as said error voltage increases and the phase with respect to said reference signal of the fundamental component of said square wave type signal depends upon the phase of said error voltage.

4. A servo system comprising a reference generator, an error generator, means connecting said reference generator to said error generator, said error generator producing an error signal, the phase of said error signal being in quadrature with the phase of said reference generator signal, a mechanical input to said error generator, the error signal from said error generator responsive in magnitude and phase to said mechanical input variation, a mixer transformer containing at least a primary connected to said reference generator and a secondary having a center tap connected to said error generator for producing third and fourth resultant voltages by converting said reference voltage into first and second voltages of equal magnitude and opposite phase and vectorially combining said first and second voltages with said error voltage to form said third and fourth resultant voltages, adding means adapted to produce a single output voltage, servo means connected to the output of said adding means, said servo means including power amplifier means for receiving the output from said adding means and a motor one winding of which is connected to receive the output from said power amplifier means, and means connecting said adding means to said mixer transformer including means for clipping said third and fourth resultant voltages at a predetermined level whereby a square wave type signal is developed which operates said servo system wherein the positive and negative portions of said square wave grows in width as said error voltage increases and the phase with respect to said reference signal of the fundamental component of said square wave type signal depends upon the phase of said error voltage.

5. A servo system as described in claim 4 wherein the means for connecting said secondary of said transformers to the inputs of said first and second clipping means includes a capacitor connected between said transformer secondary and the input of said adding means whereby said produced square wave possesses a fifty percent duty cycle.

6. In combination: means for producing an error voltage the magnitude of which is proportional to error; means for producing a reference voltage that is phased in quadrature with said error voltage; and a wave forming and signal combining network for receiving said reference voltage and said error voltage and producing a square wave output signal, the width of each wave being determined by the magnitude of said error voltage and the phase of each wave being determined by the phase of said error voltage.

7. The combination of claim 6 wherein said wave forming signal combining means includes a transformer modulator for receiving said error voltage and said reference voltage and producing a pair of modulated output signals, square wave forming means for receiving the output signals from said transformer modulator and forming a square wave signal from each said output signal, and adder means for receiving said square wave signals from said square wave forming means and combining the same.

8. In combination: a reference generator for producing a reference voltage; an error generator for producing an error voltage the magnitude of which is dependent upon the amount of error, said error voltage being phased in quadrature with said reference voltage; a wave forming and signal combining network for receiving said reference voltage and said error voltage and producing a square wave output signal such that the width of each wave is dependent upon the magnitude of said error voltage and the phase of each wave is dependent upon the phase of said error voltage with respect to said reference voltage; a power amplifier for receiving the output from said wave forming and signal combining network; a motor having a first winding connected to said reference generator and a second winding connected to said power amplifier to receive the output therefrom, whereby said motor is caused to operate in a direction determined by said error signal coupled to said second winding from said power amplifier; and means controlled by said motor and connected with said error generator for causing said error voltage to be eliminated due to the operation of said motor.

References Cited in the file of this patent

UNITED STATES PATENTS

| | | |
|---|---|---|
| 2,298,657 | Smith | Oct. 13, 1942 |
| 2,355,567 | Sparrow | Aug. 8, 1944 |
| 2,476,496 | Kliever | July 19, 1947 |
| 2,632,872 | Warsher | Mar. 24, 1955 |
| 2,833,980 | Hedgcock et al. | Mar. 6, 1958 |
| 2,873,364 | Huddleston | Feb. 10, 1959 |
| 2,921,247 | Morrison | Jan. 12, 1960 |
| 3,004,199 | Sakson | Oct. 10, 1961 |

OTHER REFERENCES

Proceedings I.R.E., vol. 37, June 1949, pp. 702–703.